United States Patent [19]

Pettijohn et al.

[11] Patent Number: 5,286,694
[45] Date of Patent: *Feb. 15, 1994

[54] LANTHANIDE HALIDE CATALYST, METHOD OF PRODUCING THE CATALYST, AND POLYMERIZATION PROCESS EMPLOYING THE CATALYST

[75] Inventors: Ted M. Pettijohn; Henry L. Hsieh, both of Bartlesville, Okla.

[73] Assignee: Phillips Petroleum Company, Bartlesville, Okla.

[*] Notice: The portion of the term of this patent subsequent to Jan. 19, 2010 has been disclaimed.

[21] Appl. No.: 805,440

[22] Filed: Dec. 11, 1991

[51] Int. Cl.$^5$ .................. C08F 4/626; C08F 10/00
[52] U.S. Cl. ...................... 502/110; 502/102; 502/111; 502/113; 502/117; 526/114
[58] Field of Search ............ 502/111, 113, 102, 110, 502/117

[56] References Cited

U.S. PATENT DOCUMENTS

| | | | |
|---|---|---|---|
| 3,429,864 | 2/1969 | Stupp | 260/94.9 |
| 3,642,746 | 2/1972 | Kashiwa et al. | 260/88.2 |
| 3,812,089 | 5/1974 | Tashiro et al. | 260/93.7 |
| 4,330,649 | 5/1982 | Kioka et al. | 526/143 |
| 4,370,455 | 1/1983 | Ueda et al. | 526/125 |
| 4,384,087 | 5/1983 | Capshew | 526/122 |
| 4,384,982 | 5/1983 | Martin | 252/429 |
| 4,524,195 | 6/1985 | Martin | 526/114 |
| 4,530,914 | 7/1985 | Einen et al. | 502/113 |
| 4,556,647 | 12/1985 | Yeh et al. | 502/102 |
| 4,575,538 | 3/1986 | Hsieh et al. | 525/244 |
| 4,699,962 | 10/1987 | Hsieh et al. | 526/142 |
| 4,801,666 | 1/1989 | Marks et al. | 526/123 |
| 4,939,217 | 7/1990 | Strickler | 526/114 |
| 5,028,673 | 7/1991 | Pettijohn et al. | 526/159 |
| 5,091,353 | 2/1992 | Kioka et al. | 526/125 |
| 5,180,702 | 1/1993 | Pettijohn | 502/107 |

OTHER PUBLICATIONS

"Study on the $NdCl_3$—supported Ziegler-Natta Catalyst for Olefin Polymerization", Xiao et al.—Makromol. Chem. 192, 1059-65 (1991).

*Primary Examiner*—Edward J. Smith
*Attorney, Agent, or Firm*—Marianne H. Michel

[57] ABSTRACT

A polymerization catalyst is formed by producing a solution of a halide of scandium, yttrium, or a rare earth metal and an alcohol; contacting the solution with an organometallic compound to form a soluble complex; and contacting the soluble complex with a halide ion exchanging source. Optionally an ester or an anhydride can also be combined with the halide solution or the soluble complex. The catalyst thus produced can be combined with an organometallic cocatalyst.

17 Claims, No Drawings

LANTHANIDE HALIDE CATALYST, METHOD OF PRODUCING THE CATALYST, AND POLYMERIZATION PROCESS EMPLOYING THE CATALYST

BACKGROUND

This invention relates to lanthanide halide catalysts.

In the polymerization of alpha-olefins, it is known to use catalyst systems comprising a transition metal compound and an organometallic compound. It is further known that the productivity of such catalyst systems can generally be improved if the transition metal compound is employed in conjunction with a metal halide, such as $MgCl_2$. Many of the prior art catalyst systems are relatively low in activity and, as a result, research continues in an effort to improve the catalyst systems with respect to production of olefin polymers.

In addition, these catalysts produce polymers of narrow molecular weight distribution. For many applications, such as extrusion and molding processes, it is highly desirable to have polymers which have a broad molecular weight distribution. Such polymers evidence excellent processability, i.e., they can be processed at a faster throughput rate with lower energy requirements with reduced melt flow perturbations.

It is also highly desirable to produce broad molecular weight distribution polymers directly in a single reactor, without having to blend polymers having different molecular weights and distribution.

SUMMARY OF THE INVENTION

It is another object of this invention to provide a high productivity catalyst system.

It is another object of this invention to provide a method to prepare an improved catalyst system useful for the polymerization of olefins.

It is another object of this invention to provide a method for producing polymers having broad molecular weight distribution and improved processability.

It is another object of this invention to provide a polymer having broad molecular weight distribution and improved processability.

In accordance with the invention, a catalyst is produced by admixing a metal halide selected from the group consisting of yttrium, scandium and rare earth metal halides and an alcohol to form a metal halide solution; combining said metal halide solution with an organometal compound, and thereafter combining the resulting composition with a halide ion exchanging source.

DETAILED DESCRIPTION OF THE INVENTION

Catalyst

The present invention is concerned with new, high productivity catalysts which employ scandium, yttrium, or rare earth metal halides which are contacted with an alcohol and optionally an ester or an anhydride to form a solution; the subsequent solution is contacted with an organometallic compound; a solid precipitate is formed when the solution is combined with a halide ion exchanging source. An organometal cocatalyst can be employed. An ester or anhydride may also be contacted when combining the halide ion exchanging source.

The metal halides are employed in the +3 oxidation state in substantially anhydrous form and comprise scandium, yttrium and rare earth elements starting with lanthanum (atomic number 57) and ending with lutetium (atomic number 71) of the Mendeleev Periodic Table. The thus defined halides will be referred to as lanthanide halides. As used herein by the term "Mendeleev Periodic Table" is meant the Periodic Table of the Elements as shown in the inside front cover of Perry, *Chemical Engineer's Handbook*, 4th Edition, McGraw Hill & Co. (1963). Generally, the lanthanide chlorides are preferred because of availability. Examples of preferred compounds include neodymium trichloride, praseodymium trichloride, lanthanum trichloride, yttrium trichloride and mixtures thereof. Neodymium trichloride is particularly preferred because of its efficacy.

Alcohols that can be used include either monohydroxy or polyhydroxy alcohols. Aliphatic or aromatic alcohols can be employed. The aliphatic alcohols can be saturated or unsaturated. Suitable monohydroxy alcohols are those containing 1 to 20 carbon atoms, preferably from 2 to 16 carbon atoms. Examples of suitable monohydroxy alcohols include methanol, ethanol, isopropanol, hexanol, 2-ethyl hexanol, octanol, decanol, dodecanol, hexadecanol and mixtures thereof.

Suitable polyhydroxy alcohols include diols and glycerols. Suitable dihydroxy alcohols are diols containing 2 to 20 carbon atoms, preferably from 2 to 16 carbon atoms. Examples of suitable diols include 1,2-ethanediol, 1,2-propanediol, 1,3-propanediol, 1,4-hexanediol, 1,2-octanediol, 1,10-decanediol, 1,12-dodecanediol, 1,2-hexadecanediol, 1,20-eicosanediol and mixtures thereof.

The alcohol is present in an amount sufficient to form a solution with the lanthanide halide. The amount required to form a solution will vary depending on the alcohol used and the lanthanide halide present.

The moles of alcohol per mole of lanthanide halide to be employed according to the invention is generally in the broad range of about 1 to about 30, preferably in the range of about 2 to about 20, and most preferably in the range of 3 to 15. Examples of amounts of especially preferred alcohols include moles of alcohol per mole of lanthanide halide of greater than 4 when the alcohol is 1,2-hexadecanediol; greater than 5 for 1,2-octanediol; and greater than 10 for 1-octanol.

The metal halide and the alcohol are combined with a suitable dry solvent or diluent (i.e. one essentially free of water). Typical solvents or diluents include, for example, normally liquid hydrocarbons having 3 to 12 carbon atoms such as n-heptane, methylcyclohexane, toluene, xylenes, and mixtures thereof. Toluene is the preferred solvent.

Generally, the amount of solvent or diluent employed can vary over a broad range. Usually the amount of solvent or diluent per gram of metal halide is within the range of about 5 to 300 grams, preferably in the range of about 10 to about 200 grams and most preferably from 10 to 100 grams.

The temperatures employed in the combination of the metal halide, the alcohol, and solvent can vary over a wide range, generally being in the range of about 0° C. to about 200° C., preferably from about 15° C. to 100° C., and most preferably from 20° C. to 75° C. The pressure employed can vary over a wide range, generally being in the range of about 0 to about 200 psig, preferably in the range of about 0 to about 100 psig, and most preferably in the range of 0 to 50 psig. Conditions are selected so that the reaction product will be in solution. The time of reaction can vary broadly from about 1 minute to about 72 hours, preferably from about 5 minutes to about 24 hours, and most preferably from 5 minutes to 10 hours.

In another embodiment of the invention, an ester and/or an anhydride can also be contacted with the catalyst components. Esters that can be used include alkyl or aromatic esters of linear or cyclic carboxylic acids having from 1 to about 20 carbon atoms and carbonic acid. Examples include methyl formate, ethyl octonate, n-butyl-eicosanoate, methyl anisate, ethyl benzoate, methyl-para-toluate, diethyl carbonate, methyl ethyl carbonate, di-(3-methylbutyl)carbonate, ethylene carbonate, diphenyl carbonate, and mixtures thereof. Ethyl benzoate and methyl-para-toluate are preferred due to excellent results and availability.

Suitable anhydrides that can be employed include, anhydrides containing a total of 2 to 20 carbon atoms per molecule. Exemplary anhydrides include decanoic anhydride, benzoic anhydride, phthalic anhydride, naphthalic anhydride, 1-napthoic anhydride, hydroxyacetic acid, 2-hydroxyoctanoic acid, and 2-hydroxyoctadecanoic acid, and mixtures thereof. Phthalic anhydride is preferred due to excellent results and availability.

The moles of ester and/or anhydride per mole of lanthanide halide to be employed is in the broad range of about 1 to about 30, preferably in the range of about 2 to about 20, and most preferably in the range of 3 to 15.

An organometal compound is contacted with the solution of lanthanide halide, alcohol, and solvent. The thus produced product will be referred to as the soluble complex. The organometal compound can be a compound selected from an element of Groups IA, IIA, IIB, and IIIA of the Mendeleev Periodic Table. Some typical examples of such compounds include lithium alkyls, Grignard reagents, dialkylmagnesium compounds, dialkylzinc compounds, and organoaluminum compounds.

It is presently preferred that the organometallic compound used in preparing the catalyst be an organoaluminum compound of the formula $AlR'_mY_{3-m}$, wherein each R' is a hydrocarbyl radical, each individually selected from the group consisting of alkenyl, alkyl, cycloalkyl, aryl, alkaryl, and aralkyl radicals containing 1 to 20 carbon atoms, Y is a monovalent radical selected from hydrogen and the halides, and m is a number in the range of 1 to 3.

Examples of specific compounds include trimethylaluminum (TMA), triethylaluminum (TEA), triisobutylaluminum (TiBA), tridodecylaluminum, trieicosylaluminum, tricyclohexylaluminum, triphenylaluminum, triisopropenylaluminum, tribenzylaluminum, diethylaluminum chloride, diethylaluminum hydride (DEAH), ethylaluminum dichloride, isopropylaluminum dibromide, diisobutylaluminum hydride (DiBAH), and mixtures thereof.

The most preferred organometallic compounds are the organoaluminum halides of the general formula $R_nAlX_{3-n}$ wherein R is a hydrocarbyl radical containing 1 to 20 carbon atoms, X is a halogen, preferably chlorine or bromine, and n is 1 to 2. Thus suitable types of organoaluminum halides are selected from dihydrocarbylaluminum halides and hydrocarbylaluminum dihalides, and mixtures thereof.

Examples include dimethylaluminum bromide, diethylaluminum chloride (DEAC), diisobutylaluminum bromide, didodecylaluminum chloride, dieicosylaluminum bromide, ethylaluminum dichloride (EADC), ethylaluminum sesquichloride (EASC), and mixtures thereof. Preferably the organometallic compound has been dissolved in a hydrocarbon solvent.

The moles of organometal per mole of lanthanide halide to be employed is generally in the broad range of about 1 to about 60, preferably in the range of about 2 to about 30, and most preferably in the range of 3 to 24.

The temperatures employed in forming the soluble complex can vary over a wide range, generally being in the range of about 0° C. to about 150° C., preferably from about 20° C. to 100° C., and most preferably from 20° C. to 75° C. The pressure employed can vary over a wide range, generally being in the range of about 0 to about 200 psig, preferably in the range of about 0 to about 100 psig, and most preferably in the range of 0 to 50 psig. Conditions are selected so that the reaction product will be in solution. The time of reaction can vary broadly from about 1 minute to about 72 hours, preferably from about 5 minutes to about 24 hours, and most preferably from 5 minutes to 10 hours.

Following the combination of the organometallic compound and the solution of the lanthanide halide and the alcohol, the composition is generally stirred or agitated for a sufficient time to insure complete mixing of the components, generally from 15 minutes to 5 hours.

The soluble complex thus formed, is then reacted with a halide ion exchanging source to produce a precipitate. The halide ion exchanging source is selected from the halide containing compounds of elements of Groups IVA and VA of the Mendeleev Periodic Table. Further according to the invention, the Group IVA and VA halide containing compounds can be combined with transition metal halides of Groups IVB and VB and organic acid halides. The term halide ion exchanging source is used herein to denote those compounds capable of adding halogen to the soluble complex and promoting the catalytic activity for olefin polymerization.

Currently preferred halide ion exchanging sources include halides of Group IVA and VA transition metals, such as titanium tetrachloride, vanadium oxychloride, zirconium oxychloride, and zirconium tetrachloride, and combinations of Group IVA and VA halides with the halides of Group IVB and VB elements, such as $COCl_2$, $PCl_3$, $SiCl_4$, $SnCl_4$, $CCl_4$ and acid chlorides of the formula R'COCl where R' is an aliphatic or aromatic radical preferably containing 1 to 20 carbon atoms. Particularly preferred halide ion exchanging sources include titanium tetrahalides, e.g. titanium tetrachloride; and combinations of titanium tetrahalides and halogenated silicon compounds, e.g. silicon tetrachloride and trichlorosilane.

The soluble complex can be contacted with the halide ion exchanging source neat or in a liquid medium. Generally, the soluble complex is contacted in a liquid diluent containing the halide ion exchanging source. Examples of suitable diluents include n-pentane, n-heptane, cyclohexane, benzene, toluene, and m-xylene.

The temperature employed in contacting the soluble complex and the halide ion exchanging source is generally in the range of about −25° C. to about 250° C., preferably about 0° C. to about 200° C., and most preferably from 0° C. to 100° C. The pressure employed can vary over a wide range, generally being in the range of about 0 to about 200 psig, preferably in the range of about 0 to about 100 psig, and most preferably in the range of 0 to 50 psig. The time of reaction can vary broadly from about 1 minute to about 72 hours, preferably from about 5 minutes to 24 hours, and most preferably from 5 minutes to 10 hours.

While the moles of halide ion exchanging source per mole of lanthanide halide can be selected over a wide range, generally about 0.01 to about 200 will be employed, preferably from about 0.1 to about 20, and most preferably from 0.1 to 10. Following the treatment of the soluble complex with the halide ion exchanging source to form a solid catalyst, the surplus halide ion exchanging source can be removed by washing with a dry liquid of the type used in the previous step. The resulting product can be stored under dry nitrogen until use.

Cocatalyst

In the polymerization of olefins, the inventive catalyst system can be used with a suitable cocatalyst of the type generally used with titanium-containing olefin polymerization catalysts. Typical examples include organometallic compounds of Groups I, II, and III of the Mendeleev Periodic Table, i.e. alkali metal alkyls or aryls, dialkylmagnesium, dialkylzinc, Grignard reagents, and organoaluminum compounds.

It is presently preferred that the cocatalyst used in preparing the catalyst system be an organoaluminum compound of the formula $AlR'_mY_{3-m}$, wherein each $R'$ is a hydrocarbyl radical, each individually selected from the group consisting of alkenyl, alkyl, cycloalkyl, aryl, alkaryl, and aralkyl radicals containing 1 to 20 carbon atoms, Y is a monovalent radical selected from hydrogen and the halides, and m is a number in the range of 1 to 3.

Examples of specific compounds include trimethylaluminum (TMA), triethylaluminum (TEA), triisobutylaluminum (TiBA), tridodecylaluminum, trieicosylaluminum, tricyclohexylaluminum, triphenylaluminum, triisopropenylaluminum, tribenzylaluminum, diethylaluminum chloride, diethylaluminum hydride (DEAH), ethylaluminum dichloride, isopropylaluminum dibromide, diisobutylaluminum hydride (DiBAH), and mixtures thereof. For the polymerization of monomers consisting predominantly of ethylene, it is currently preferred to use a trialkylaluminum cocatalyst such as triethylaluminum.

The amount of cocatalyst employed in the catalyst system during the polymerization process can vary widely. Generally, the moles of organometal cocatalyst per mole of halide ion exchanging source employed in forming the inventive catalyst system is about 0.1 to about 500, preferably from about 1 to about 100, and most preferably from 1 to 50.

If desired, the catalyst system can be mixed with a particulate diluent such as silica, silica-alumina, silica-titania, magnesium dichloride, magnesium oxide, polyethylene, polypropylene, and poly(phenylene sulfide), prior to using the composition in a polymerization process. The weight ratio of diluent to catalyst can range from about 0.01 to about 1000.

Reactants

The inventive catalyst system is useful for the polymerization of olefins. Typical polymerizable olefins include the aliphatic monoolefins having 2 to 18 carbon atoms. The term polymerization is used herein to include both homo- and co-polymerization. In copolymerization other polymerizable monomers can be employed with the olefins, such as conjugated and nonconjugated dienes.

Suitable olefins include ethylene, propylene, 1-butene, 1-hexene, 4-methyl-1-pentene, styrene, 1,3-butadiene, isoprene, 1,5-hexadiene, trans-1,3-pentadiene, trans-1,3-hexadiene, trans-2-methyl-1,3-pentadiene, trans-3-methyl-1,3-pentadiene, 2,3-dimethyl-1,3-butadiene, trans-trans-2,4-hexadiene and mixtures containing 2 or more polymerizable unsaturated hydrocarbons. A particular group of olefins to be polymerized according to the invention includes unsaturated hydrocarbons having 2 to 6 carbon atoms and having at least one polymerizable ethylenic double bond. The inventive catalyst is particularly well suited for the preparation of ethylene homopolymers and copolymers which contain at least 90 mole percent, and preferably at least 95 mole percent ethylene.

The polymerization reaction can be carried out in the presence of a solvent or a diluent. Suitable as the solvent for the instant reaction system are inert hydrocarbons such as n-butane, isobutane, n-pentane, n-hexane, n-heptane, isooctane, cyclohexane, methylcyclohexane, benzene, toluene, xylene, tetralin, decalin, and other aliphatic, alicyclic, aromatic hydrocarbons, or mixtures thereof. The polymerization can be carried out in gas phase in the absence of solvent or diluent.

Polymerization Conditions

The catalyst system of this invention, that is the catalyst and cocatalyst, can be employed in a batchwise, semi-continuous, or in a continuous polymerization process. Generally, the present polymerization reaction can be carried out at a temperature in the range of about 0° C. to about 200° C., preferably a temperature of about 25° C. to about 150° C., and most preferably from 25° C. to 100° C. Polymerization pressure can vary depending on the type of monomer, the catalyst activity, the desired degree of polymerization, etc. Polymerization pressure can be subatmospheric or superatmospheric pressure up to about 300 atmospheres, preferably from atmospheric pressure up to about 100 atmospheres, and most preferably from atmospheric pressure up to 50 atmospheres. Contacting time for the catalyst and the olefins can vary broadly, generally up to about one week, more preferably from about 1 minute up to about 24 hours, and most preferably from 5 minutes up to 5 hours.

Generally, when using a solvent or diluent in the instant polymerization reaction, it is convenient to introduce olefin into a dispersion containing the catalyst system of the present invention in the solvent or diluent. The catalyst composition can be added in its whole amount to the polymerization system at the start or it can be added portion-wise over the period for the polymerization.

In a batch process of polymerizing ethylene, for example, a stirred autoclave is conditioned by purging with dry nitrogen and then with the hydrocarbon diluent that is to be employed in the polymerization process such as isobutane, for example. Generally, although order is immaterial, the cocatalyst is charged through an entry port followed by the catalyst. After closing the port, hydrogen, if used, is added, and the hydrocarbon diluent is then charged.

The reactor is then heated to the desired reaction temperature, e.g. about 50° to about 120° C., the ethylene is admitted and maintained at a partial pressure within a range of about 0.5 to about 5.0 MPa (70–725 psig). At the end of the reaction period, generally about 1 hour for bench scale testing, the polymerization reaction is terminated by venting unreacted olefin and diluent. The reactor is then opened and the free-flowing white ethylene polymer is collected, dried, and weighed.

In a continuous process, for example, a suitable reactor such as a loop reactor is continuously charged with suitable quantities of solvent or diluent, catalyst, cocatalyst, olefin, and hydrogen, if used. The contact between the catalyst system and monomer can be effected by various ways. For example, the olefin can be contacted with the catalyst in the form of a fixed bed, a slurry, a fluid bed, or a movable bed.

The polymerization reaction can be carried out in the presence of molecular hydrogen to regulate the molecular weight of the olefin polymers, as known in the art.

Products

The reactor product is continuously or intermittently withdrawn, and the polymer recovered, e.g. flashing diluent and unreacted olefin and drying the product. In order to recover a produced polymer from the polymerization system, the crude polymerization product is for example taken up and subjected to flash separation, solvent extraction, hot filtration under a pressure, or centrifugal separation to yield a substantially pure polymeric product. A selection of the polymerization conditions for the process of the present invention, as well as the method for the recovery and purification of the polymeric product will be understood by those skilled in the art from the conventional low or modest pressure polymerization processes for olefins.

The following examples will serve to show the present invention in detail by way of illustration and not by way of limitation.

EXAMPLES

A further understanding of the present invention and its various aspects and advantages will be provided by the following examples. The catalyst systems used in the following examples, unless indicated otherwise, were prepared by charging toluene and a solution prepared by combining $NdCl_3$, alcohol, and toluene to a reaction vessel. The organoaluminum compound was added at ambient temperature. The reaction was continued for about 1 hour before $TiCl_4$ was added to the solution. An aliquot of the slurry was used or the resulting solid catalyst was recovered and dried then reslurried prior to use.

In the following examples, unless indicated otherwise, the polymerization reactions were performed in a one liter, stirred autoclave at a temperature of 50° C. Prior to the reactions, the autoclave was washed thoroughly with dry cyclohexane and purged with nitrogen. Cyclohexane was added to the reactor and the desired temperature obtained and maintained. The slurried catalyst was charged through a small port under a counter flow of ethylene. The reactor was sealed and the ethylene pressure increased to a total reactor pressure of 550 psig. At the end of the reaction, solvent and ethylene were rapidly vented and the solid polymer was collected and dried.

EXAMPLE I

A series of polymerization runs was carried out using catalyst systems prepared from various organoaluminum compounds. The following molar ratios were employed in the preparation of the catalyst systems: 1 mole $NdCl_3$, 4 moles 1,2-hexadecanediol, 10 moles of organoaluminum compound (as Al), and 300 moles TEA as cocatalyst per mole of $TiCl_4$. 0.0002 mmol Ti was present in the reactor. The polymerizations were carried out at 50° C. for 30 min. One control with no $NdCl_3$ was run under similar conditions. The results are summarized in Table 1.

TABLE 1

| Organoaluminum compound | Activity g PE/gTi/h |
|---|---|
| DEAC (control no Nd) | 338,000 |
| DEAC | 4,088,000 |
| EADC | 2,658,000 |
| EASC | 2,459,000 |
| TEA | 885,000 |
| DiBAH | 301,000 |
| TiBA | 169,000 |
| TMA | 159,000 |
| DEAH | 65,000 |

Table 1 demonstrates that useful catalyst systems are produced by reacting a lanthanide halide, an alcohol, an organoaluminum compound and a transition metal compound in conjunction with a trialkylaluminum cocatalyst. Especially good results were produced with organoaluminum halide compounds, and most preferably with diethyl aluminum chloride. The control run with no neodymium shows reduced catalyst activity.

EXAMPLE II

Another series of polymerization runs was carried out employing catalyst systems using various alcohols. The following molar ratios were employed in the preparation of the catalyst: 1 mole $NdCl_3$, 10 moles of DEAC (as the organometal to form the soluble complex), and 300 moles of TEA as cocatalyst per mole of $TiCl_4$. 0.0002 mmol of Ti was present in the reactor. The polymerizations were carried out at 50° C. for 30 min.

TABLE 2

| Catalyst | Activity g PE/g Ti/h |
|---|---|
| 10 DEAC/$TiCl_4$ | 77,000 |
| $NdCl_3$/4 1,2-hexadodecanediol/10 DEAC/$TiCl_4$ | 4,300,000 |
| $NdCl_3$/5 1,2-octanediol/10 DEAC/$TiCl_4$ | 6,400,000 |
| $NdCl_3$/10 1-octanol/10 DEAC/$TiCl_4$ | 7,400,000 |

Table 2 demonstrates good catalyst activity when the moles of alcohol per mole of $NdCl_3$ was was at least 4. The comparative run without alcohol or neodymium shows reduced catalyst activity.

EXAMPLE III

Another series of polymerization runs was carried out using catalyst systems prepared from various ratios of Al(DEAC) to 1,2-octanediol in the soluble complex. The following molar ratios were employed: 1 mole $NdCl_3$ and 5 moles alcohol and 300 moles of TEA as cocatalyst per mole of $TiCl_4$. 0.0002 mmol Ti was present in the reactor. The polymerizations were carried out at 50° C. for 30 minutes. The results are summarized in Table 3.

TABLE 3

| DEAC/OH Ratio | Activity g PE/g Ti/h |
| --- | --- |
| 1:2 | 430,000 |
| 1:1 | 6,400,000 |
| 2:1 | 5,500,000 |

Table 3 demonstrates that catalysts with better activity are produced when the aluminum compound used in the soluble complex, is present in an amount at least equal to or greater than the alcohol.

EXAMPLE IV

Another series of polymerization runs was carried out using catalyst systems prepared from various ratios of $NdCl_3$ to $TiCl_4$. The following molar ratios were employed: 10 moles DEAC and 5 moles 1,2-octanediol per mole of $NdCl_3$ in the soluble complex. The polymerization were carried out at 50° C. for 30 min. 300 moles of TEA per mole of titanium was used as cocatalyst. 0.0002 mmol of Ti was present in the reactor. The results are summarized in Table 4.

TABLE 4

| Nd/Ti Ratio | Activity g PE/g Ti/h |
| --- | --- |
| 10:1 | 5,600,000 |
| 1:1 | 6,400,000 |
| 1:2 | 3,700,000 |
| 1:3 | 2,200,000 |
| 1:4 | 1,600,000 |
| 1:5 | 470,000 |
| 1:10 | 63,000 |

Table 4 demonstrates the effect of the Nd/Ti ratio on catalyst activity. Catalysts with better activity were produced when Nd was present in a molar amount equal to or greater than the Ti.

EXAMPLE V

The catalyst system used in the example V was prepared by charging 300 mls of toluene and a solution prepared by combining 2.50 g $NdCl_3$, 7.30 g 1,2-octanediol and 100 ml toluene to a 1 liter reactor. The temperature was raised to 50° C. and 62 ml of 2.5M DEAC was added. The reaction was continued for 1 hour. 2.2 mls(20 mmol) $TiCl_4$ was added to the solution and the reaction continued for 1 hour at 50° C. The resulting solid catalyst was recovered and dried. The catalyst yield was 7.36 g and analysis showed 13% Ti and 9% Nd.

The polymerization reactions in the example V were conducted in a 1-gal stirred autocalve. Catalyst and cocatalyst were charged to a dry reactor under counterflow of ethylene at ambient temperature. The reactor was sealed and ethylene flow stopped. Two liters of iso-butane were added as reaction solvent. The reactor temperature was increased to 90° C. and hydrogen and ethylene ($\Delta P=200$) were admitted. The reaction temperature and ethylene pressure were maintained for 1 hour. The solvent was then removed and the polymer collected as a dry fluff.

A series of polymerization reactions was run using the catalyst described above. The results and variables are summarized below.

TEA is the mole ratio of cocatalyst (TEA) to Ti.

mg is mg of catalyst used in the polymerization.

$H_2$ is the partial pressure of hydrogen, $\Delta P(H_2)$, as psig.

$C_6=$ is grams of 1-hexene.

Activity is expressed as grams of polymer per gram of titanium per hour.

MI is melt index, g/10 minutes, ASTM D1238-65T, conditions E.

HLMI is high load melt index, g/10 minutes, ASTM D1238-65T, condition F.

SR is shear response and is the ratio of HLMI/MI.

Density is g/mL.

HI is heterogeneity index and is the ratio of $M_w/M_n$.

$M_w$ is the weight average molecular weight.

$M_n$ is the number average molecular weight.

TABLE 5

| Run | TEA | mg | $H_2$ | $C_6=$ | Activity | MI | HLMI | SR | Density | HI | Mw/1000 |
| --- | --- | --- | --- | --- | --- | --- | --- | --- | --- | --- | --- |
| 501 | 4 | 10 | 47 | 0 | 22,200 | 0.05 | 3.32 | 66 | 0.9536 | 12 | 282 |
| 502 | 8 | 10 | 47 | 0 | 205,000 | 0.03 | 1.77 | 59 | 0.9567 | — | — |
| 503 | 12 | 10 | 47 | 0 | 155,000 | 0.02 | 2.25 | 75 | — | — | — |
| 504 | 16 | 10 | 47 | 0 | 112,000 | 0.02 | 1.21 | 61 | 0.9544 | — | — |
| 505 | 20 | 10 | 47 | 0 | 93,800 | 0.02 | 1.33 | 67 | 0.9550 | — | |
| 506 | 41 | 10 | 47 | 0 | 42,300 | 0 02 | 1.03 | 52 | 0 9550 | — | — |
| 507 | 122 | 10 | 47 | 0 | 14,600 | 0.01 | 0.80 | 80 | 0.9582 | — | — |
| 508 | 162 | 10 | 47 | 0 | 6,500 | — | — | — | — | — | — |
| 509 | 8 | 20 | 0 | 0 | 258,000 | 0.00 | 0.00 | — | 0.9412 | — | — |
| 510 | 8 | 20 | 47 | 0 | 90,000 | 0.02 | 1.54 | 77 | 0.9561 | — | — |
| 511 | 8 | 20 | 100 | 0 | 72,300 | 0.15 | 8.50 | 57 | 0.9596 | — | — |
| 512 | 8 | 20 | 47 | 0 | 90,000 | 0.02 | 1.54 | 77 | 0.9561 | — | — |
| 513 | 8 | 20 | 47 | 45 | 85,000 | 0.09 | 4.44 | 49 | 0.9471 | 12 | 293 |
| 514 | 8 | 20 | 47 | 90 | 112,000 | 0.15 | 7.46 | 50 | 0.9438 | 11 | 251 |
| 515 | 8 | 20 | 47 | 135 | 53,000 | 0.37 | 18.16 | 49 | 0.9416 | 10 | 189 |
| 516* | 9 | 10 | 47 | 0 | 15,000 | 0.06 | 2.38 | 40 | 0.9562 | 7.0 | 299 |
| 517* | 22 | 10 | 47 | 0 | 105,000 | 0.15 | 6.20 | 41 | 0.9561 | 6.4 | 215 |
| 518* | 44 | 10 | 47 | 0 | 130,000 | 0.38 | 12.24 | 32 | 0.9596 | 5.8 | 182 |
| 519* | 132 | 10 | 47 | 0 | 208,000 | 0.60 | 21.18 | 35 | 0.9582 | 5.1 | 150 |

*comparative runs containing $HgCl_2$ and no $NdCl_3$ or alcohol

Table 5 demonstrates that a high activity catalyst can be produced with very low TEA/Ti ratio, Run 502 shows especially high activity. The catalyst activity peaks at 8 moles of TEA per mole of Ti and decreases with increasing TEA/Ti ratio, Runs 501-508. Runs 509-11 demonstrate the effect of varying amounts of hydrogen. The density and HLMI increase and the activity decreases with increasing hydrogen. Runs 512-15 demonstrate the effect of varying the hexene in the reaction. The density decreases somewhat indicating some hexene incorporation. The HLMI increases with increasing hexene. HI values above 6.0 and shear response values greater than 40 indicate a polymer of broad molecular weight distribution.

The comparative runs 516-19, using a MgCl₂ based catalyst, show the reverse effect, i.e. the catalyst activity increases with increasing Al/Ti ratio. Runs 516-19 employed a catalyst sold by Catalyst Resources, Inc. which was prepared by a process of the general type disclosed in U.S. Pat. Nos. 4,363,746; 4,325,837; and 4,326,988 and contained about 12 weight percent titanium. The catalyst is one which is prepared by forming a solution of titanium tetraethoxide and magnesium chloride and precipitating a solid from that solution by the addition of ethylaluminum sesquichloride under conditions such that prepolymer is deposited upon the solid. The resulting solid is then contacted with titanium tetrachloride. Such catalysts generally contain about 1 to about 30 weight percent prepolymer, more typically about 4 to about 10 weight percent prepolymer. A 15 weight percent solution of TEA in heptane was used as the cocatalyst. Alcohol was not used in the preparation of the comparative catalyst.

The molecular weight of the polymer produced by the inventive catalyst increases with increasing TEA/Ti ratio, as reflected in decreasing melt index values shown in Runs 501-508. Comparative runs 516-19 using MgCl₂ show the opposite effect. The shear response of the comparative runs is about 30 to about 40. The polymers produced by the inventive catalyst have higher shear response than the comparative runs, demonstrating a polymer with broader molecular weight distribution which can be more readily processed.

EXAMPLE VI

A series of polymerization runs was carried out using varying amounts of the ester ethyl benzoate in preparing the catalyst system. The catalyst system was prepared using the following molar ratios: 1 mole NdCl₃, 5 moles 1,2-octanediol, 11 moles of DEAC (as Al), and 300 moles of TEA as cocatalyst per mole of TiCl₄. 0.0002 mmol of Ti was present in the reactor. The moles of ethyl benzoate per mole of TiCl₄ is indicated in the first column. The polymerizations were carried out at 50° C. for 30 min.

TABLE 6

| Ethyl Benzoate | Activity g PE/gTi/h |
| --- | --- |
| 1 | 2,628,000 |
| 2 | 3,520,000 |
| 3 | 2,330,000 |

Table 6 demonstrate that useful catalyst systems are produced by reacting a lanthanide halide, an alcohol, an ester, an organoaluminum compound and a transition metal compound in conjunction with a trialkylaluminum cocatalyst.

EXAMPLE VII

A series of polymerization runs was carried out using 4-methyl-1-pentene (4MP1) as comonomer. The catalyst system was prepared using the following molar ratios: 10 moles NdCl₃, 40 moles 1,2-octanediol, 100 moles of DEAC (as Al), and 300 moles of TEA as cocatalyst per mole of TiCl₄.

TABLE 7

| 4MP1 | Ti mmols | Activity g PE/gTi/h |
| --- | --- | --- |
| 15 mls | 0.0002 | 14,008,000 |
| 15 mls | 0.00002 | 10,960,000 |

Table 7 demonstrates that the inventive catalyst system maintains high activity and produces polymer in the presence of 4MP1 comonomer.

While this invention has been described in detail for the purpose of illustration, it is not to be construed as limited thereby, but is intended to cover all changes and modifications within the spirit and scope thereof.

That which is claimed is:

1. A process for producing a polymerization catalyst comprising:
   (1) contacting at least one metal halide selected from the halides of scandium, yttrium, and rare earth metals having atomic numbers in the range of 57 to 71 with at least one alcohol to form a lanthanide halide solution;
   (2) contacting the solution of (1) with an organometallic compound to form a complex in solution; and
   (3) contacting the complex of (2) with a halide ion exchanging source to form a solid catalyst;
   wherein said organometallic compound is selected from compounds wherein the metal is selected from the Groups IA, IIA, IIB, and IIIA.

2. A process according to claim 1 further comprising contacting said solid catalyst with a cocatalyst comprising organometallic compounds of metals of Groups IA, IIA, IIB, and IIIA to produce a catalyst system.

3. A process according to claim 2 wherein said alcohol is present in an amount in the range of about 1 to about 30 moles of alcohol per mole of metal halide;
   said organometallic compound is present in an amount in the range of about 1 to about 60 moles of organometallic compound per mole of metal halide;
   said halide ion exchanging source is present in an amount in the range of about 0.01 to about 200 moles of halide ion exchanging source per mole of metal halide; and
   said cocatalyst is present in an amount in the range of about 0.1 to about 500 moles of cocatalyst per mole of halide ion exchanging source.

4. A process according to claim 3 wherein said contacting in step (1) is carried out at a temperature of from about 0° to about 200° C.; and a pressure of about 0 to about 200 psig; for a time within the range of from about 1 min to about 72 hrs;
   said contacting in step (2) is carried out at a temperature of from about 0° to about 150° C.; and a pressure of about 0 to about 200 psig; for a time within the range of from about 1 min to about 72 hrs; and
   said contacting in step (3) is carried out at a temperature of from about −25° to about 250° C.; and a pressure of about 0 to about 200 psig; for a time within the range of from about 1 min to about 72 hrs.

5. A process according to claim 1 further comprising; contacting said metal halide solution with at least one ester.

6. A process according to claim 1 further comprising; contacting said metal halide solution with at least one anhydride.

7. A process according to claim 1 further comprising; contacting said complex with at least one ester.

8. A process according to claim 1 further comprising; contacting said complex with at least one anhydride.

9. A process according to claim 2 wherein said metal halide is selected from the halides of neodymium, praseodymium, lanthanum, yttrium, and mixtures thereof;

wherein said alcohol is selected from the group consisting of alcohols having from 1 to 20 carbon atoms;

wherein said organometallic compound is selected from the group consisting of organoaluminum halides of the general formula

$R_nAlX_{3-n}$ wherein R is a hydrocarbyl radical containing 1 to 20 carbon atoms, X is a halogen, and n is 1 to 2;

wherein said halide ion exchanging source is a transition metal tetrahalide; and wherein said cocatalyst is a trialkylaluminum compound.

10. A process according to claim 9 wherein said alcohol is present in an amount in the range of about 2 to about 20 moles of alcohol per mole of metal halide;

said organoaluminum compound is present in an amount in the range of about 2 to about 30 moles of organometallic compound per mole of metal halide;

said halide ion exchanging source is present in an amount in the range of about 0.1 to about 20 moles of halide ion exchanging source per mole of metal halide; and said trialkylaluminum compound is present in an amount in the range of about 1 to about 100 moles of trialkylaluminum compound per mole of halide ion exchanging source.

11. A process according to claim 10 wherein said contacting in step (1) is carried out at a temperature of from about 15° to about 100° C.; and a pressure of about 0 to about 100 psig; for a time within the range of from about 5 min to about 24 hrs;

said contacting in step (2) is carried out at a temperature of from about 20° to about 100° C.; and a pressure of about 0 to about 100 psig; for a time within the range of from about 5 min to about 24 hrs; and said contacting in step (3) is carried out at a temperature of from about 0° to about 200° C.; and a pressure of about 0 to about 100 psig; for a time within the range of from about 5 min to about 24 hrs.

12. A process according to claim 5 wherein said ester is selected from the group consisting of alkyl and aromatic esters having from 1 to 20 carbon atoms.

13. A process according to claim 12 wherein said ester is ethyl benzoate.

14. A process according to claim 6 wherein said anhydride is selected from the group consisting of anhydrides having from 2 to 20 carbon atoms.

15. A process according to claim 14 wherein said anhydride is phthalic anhydride.

16. A process for producing a catalyst system comprising:

(1) contacting neodymium trichloride with 1,2-octanediol to form a neodymium trichloride solution;

(2) contacting the solution of (1) with diethylaluminum chloride to form a complex in solution;

(3) contacting the complex of (2) with titanium tetrachloride to form a solid catalyst; and (4) contacting said catalyst with triethylaluminum to produce a catalyst system;

wherein said 1,2-octanediol is present in an amount in the range of 3 to 15 moles of alcohol per mole of neodymium trichloride;

said diethylaluminum chloride is present in an amount in the range of 3 to 30 moles of diethylaluminum chloride per mole of neodymium trichloride;

said titanium tetrachloride is present in an amount in the range of 0.1 to 10 moles of titanium tetrachloride per mole of neodymium trichloride;

said triethylaluminum is present in the range of 1 to 50 moles of triethylaluminum per mole of titanium tetrachloride;

wherein said contacting in step (1) is carried out at a temperature of from 20° to 75° C.; and a pressure of 0 to 50 psig; for a time within the range of from 5 min to 10 hrs;

said contacting in step (2) is carried out at a temperature of from 20° to 75° C.; and a pressure of 0 to 50 psig; for a time within the range of from 5 min to 10 hrs; and said contacting in step (3) is carried out at a temperature of from 0° to 100° C.; and a pressure of 0 to 50 psig; for a time within the range of from 5 min to 10 hrs.

17. A catalyst system produced according to the process of claim 16.

* * * * *